United States Patent
Lu et al.

(10) Patent No.: US 8,687,331 B2
(45) Date of Patent: Apr. 1, 2014

(54) PROTECTION TO AVOID ABNORMAL OPERATION CAUSED BY A SHORTED PARAMETER SETTING PIN OF AN INTEGRATED CIRCUIT

(75) Inventors: Shao-Hung Lu, Taoyuan (TW); Jing-Meng Liu, Jubei (TW); Jo-Yu Wang, New Taipei (TW); Isaac Y. Chen, Jubei (TW); An-Tung Chen, Pingjen (TW)

(73) Assignee: Richtek Technology Corp., Hsinchu (TW)

( * ) Notice: Subject to any disclaimer, the term of this patent is extended or adjusted under 35 U.S.C. 154(b) by 217 days.

(21) Appl. No.: 13/092,282

(22) Filed: Apr. 22, 2011

(65) Prior Publication Data
US 2011/0261492 A1    Oct. 27, 2011

(30) Foreign Application Priority Data
Apr. 27, 2010 (TW) .............................. 99113278 A

(51) Int. Cl.
*H02H 3/00* (2006.01)

(52) U.S. Cl.
USPC .............................................. 361/78; 361/79

(58) Field of Classification Search
USPC ........................................................ 361/79
See application file for complete search history.

(56) References Cited

U.S. PATENT DOCUMENTS

2011/0261492 A1* 10/2011 Lu et al. ..................... 361/79

* cited by examiner

*Primary Examiner* — Dharti Patel
(74) *Attorney, Agent, or Firm* — Muncy, Geissler, Olds & Lowe, P.C.

(57) ABSTRACT

For a system to avoid abnormal operation caused by a shorted parameter setting pin of an integrated circuit, a protection apparatus and method apply a buffered reference voltage to the parameter setting pin to define an internal parameter of the integrated circuit by the buffered reference voltage and an external element connected to the parameter setting pin, and detect the rapid variation of the internal parameter to trigger a shutdown signal or slow down the speed of the variation of the internal parameter reflected to an adjustable signal of the integrated circuit.

13 Claims, 7 Drawing Sheets

PROTECTION TO AVOID ABNORMAL OPERATION CAUSED BY A SHORTED PARAMETER SETTING PIN OF AN INTEGRATED CIRCUIT

FIELD OF THE INVENTION

The present invention is related generally to a protection apparatus and method for integrated circuits (ICs) and, more particularly, to a protection apparatus and method for a system to avoid abnormal operation caused by a shorted parameter setting pin of an IC.

BACKGROUND OF THE INVENTION

It is popular to set the internal parameter of an IC by an external device, for example, Linear Technology Corporation's product no. LTC6900 discloses an oscillator IC having two setting pins to be connected a resistor, a current source or a combination of a voltage source and a resistor therebetween for setting the oscillator frequency, and Intersil Corporation's product no. ISL6549 and Richtek Technology Corporation's product no. RT9259 disclose a controller IC having a setting pin to be connected to a resistor for setting the frequency of an internal oscillator in the IC. However, if the pin connected to the external parameter setting device is shorted to another pin or a hand, the resultant internal parameter may be affected and in turn lead to an error, or unstable or abnormal operation of the system using the IC. For example, in a typical power supply as shown in FIG. 1, a pulse width modulation (PWM) system uses a frequency adjustable oscillator 10 to provide a ramp signal RAMP for a PWM controller 12 to control the switching frequency of the pulse width modulation signal PWM generated by the PWM controller 12. The frequency of the oscillator 10 can be adjusted by changing a current IFS supplied to the oscillator 10, for which a reference voltage VREF is buffered by a buffer 14 to apply to a parameter setting pin FS_DIS, and the buffered reference voltage VREF and an external resistor RRT define an internal parameter I1=VREF/RRT which is mirrored by a current mirror composed of transistors M4 and M5 to generate the current IFS. Therefore, adjusting the resistance of the resistor RRT will adjust the frequency of the oscillator 10. Referring to FIG. 1 and FIG. 2, if the pin FS_DIS is shorted to another pin BOOT at time t1, for example by accumulated dust or a conductor such as water or metal therebetween, a current I2 will flow from the pin BOOT to the pin FS_DIS, causing the resistor RRT to have an increased current I3=I1+I2 and thereby increasing the voltage of the pin FS_DIS, as shown by waveform 22. Since the impedance Rs between the pins BOOT and FS_DIS is very small, the current I2 will be much larger than the current I1, causing the current IFS to decrease. Thereby, the frequency of the ramp signal RAMP is lowered, resulting in a longer period of the ramp signal RAMP lower than the feedback signal COMP, as shown by waveforms 24 and 26. The on time of the transistor M1 becomes longer because its control signal UG is postponed to turn off, as shown by waveform 28. Thus, the output voltage Vo may bounce, as shown by waveform 30, which is risky to damage the next stage. This case is worse under operation of high switching frequency, typically higher than 400 KHz and even up to 600 KHz. The customer may use smaller inductor L or smaller capacitor C in the power stage 16 to gain better transient response, so the output voltage Vo is more likely to bounce and rise faster. To date, there has been no special protection for such abnormal condition.

Although over voltage protection (OVP) may be provided to a power supply, it is almost not work because OVP needs a delay time, typically 3-10 µs, to guarantee noise immunity, and the PWM system will become crazy under this time interval. As shown by waveforms 30 and 32, during this delay time, the output voltage Vo can rise to a very high level. Although over current protection (OCP) may be provided to a power supply, the function may not work because the customer may set the OCP level higher two or more than two times of operation load. Smaller capacitor C and smaller inductor L may cause the output voltage Vo bounce fast with only several cycles, even 2-3 cycles.

Therefore, it is desired a protection apparatus and method for a parameter setting pin of an IC.

SUMMARY OF THE INVENTION

An objective of the present invention is to provide a protection apparatus and method for a system to avoid abnormal operation caused by a shorted parameter setting pin of an IC.

According to the present invention, a protection apparatus for a system to avoid abnormal operation caused by a shorted parameter setting pin of an integrated circuit includes a buffer to buffer a reference voltage to the parameter setting pin to define an internal parameter of the integrated circuit by the buffered reference voltage and an external device connected to the parameter setting pin, and a detection circuit to detect a rapid variation of the internal parameter to trigger a shutdown signal.

According to the present invention, a protection apparatus for a system to avoid abnormal operation caused by a shorted parameter setting pin of an integrated circuit includes a buffer to buffer a reference voltage to the parameter setting pin to define an internal parameter of the integrated circuit by the buffered reference voltage and an external device connected to the parameter setting pin, and a low pass filter to slow down a speed of the variation of the internal parameter reflected to an adjustable signal of the integrated circuit.

According to the present invention, a protection method for a system to avoid abnormal operation caused by a shorted parameter setting pin of an integrated circuit includes applying a buffered reference voltage to the parameter setting pin to define an internal parameter of the integrated circuit by the buffered reference voltage and an external device connected to the parameter setting pin, and detecting a rapid variation of the internal parameter to trigger a shutdown signal.

According to the present invention, a protection method for a system to avoid abnormal operation caused by a shorted parameter setting pin of an integrated circuit includes applying a buffered reference voltage to the parameter setting pin to define an internal parameter of the integrated circuit by the buffered reference voltage and an external device connected to the parameter setting pin, and slowing down a speed of the variation of the internal parameter reflected to an adjustable signal of the integrated circuit.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
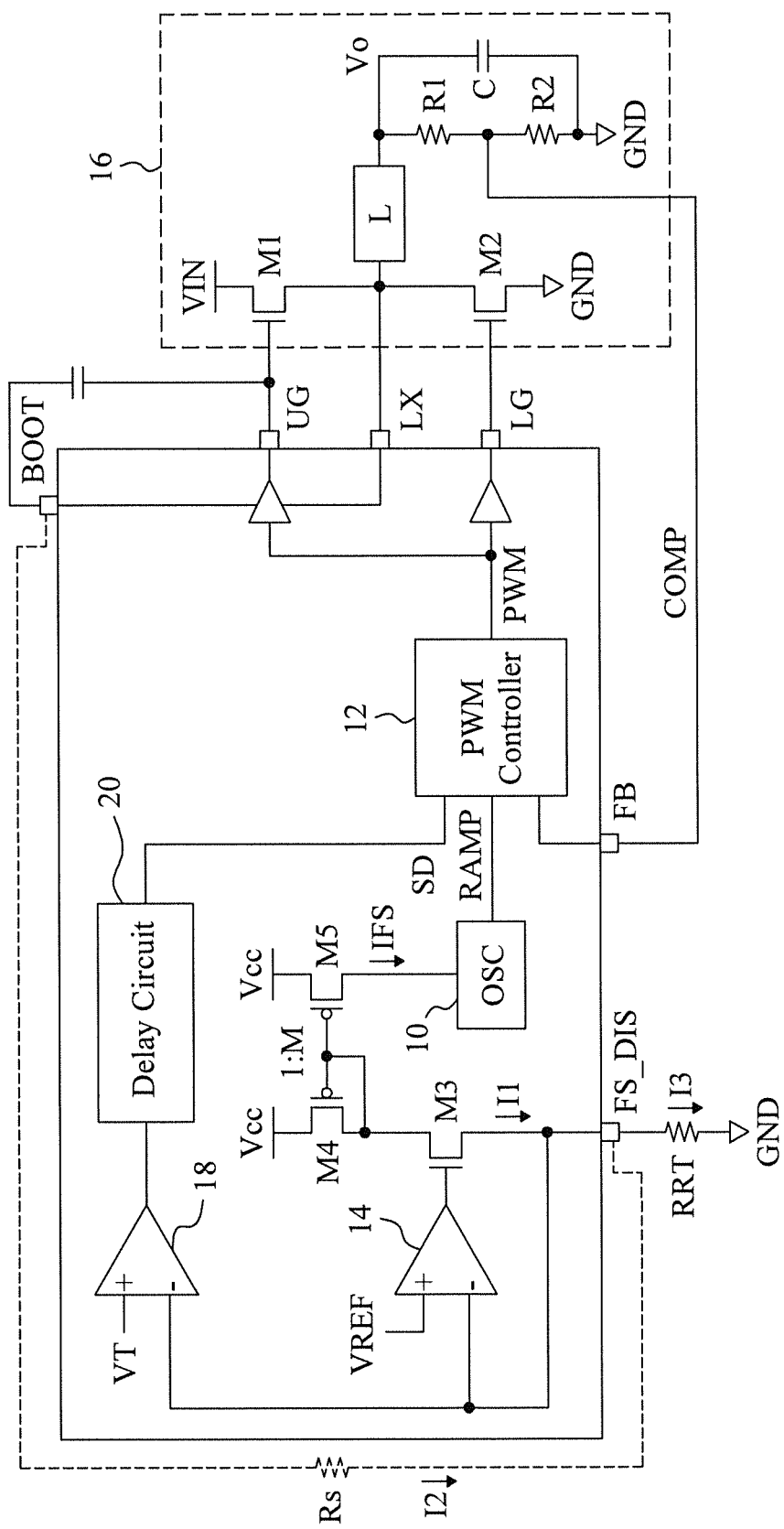
FIG. 1 is a circuit diagram of a typical power supply.
Figure 2:
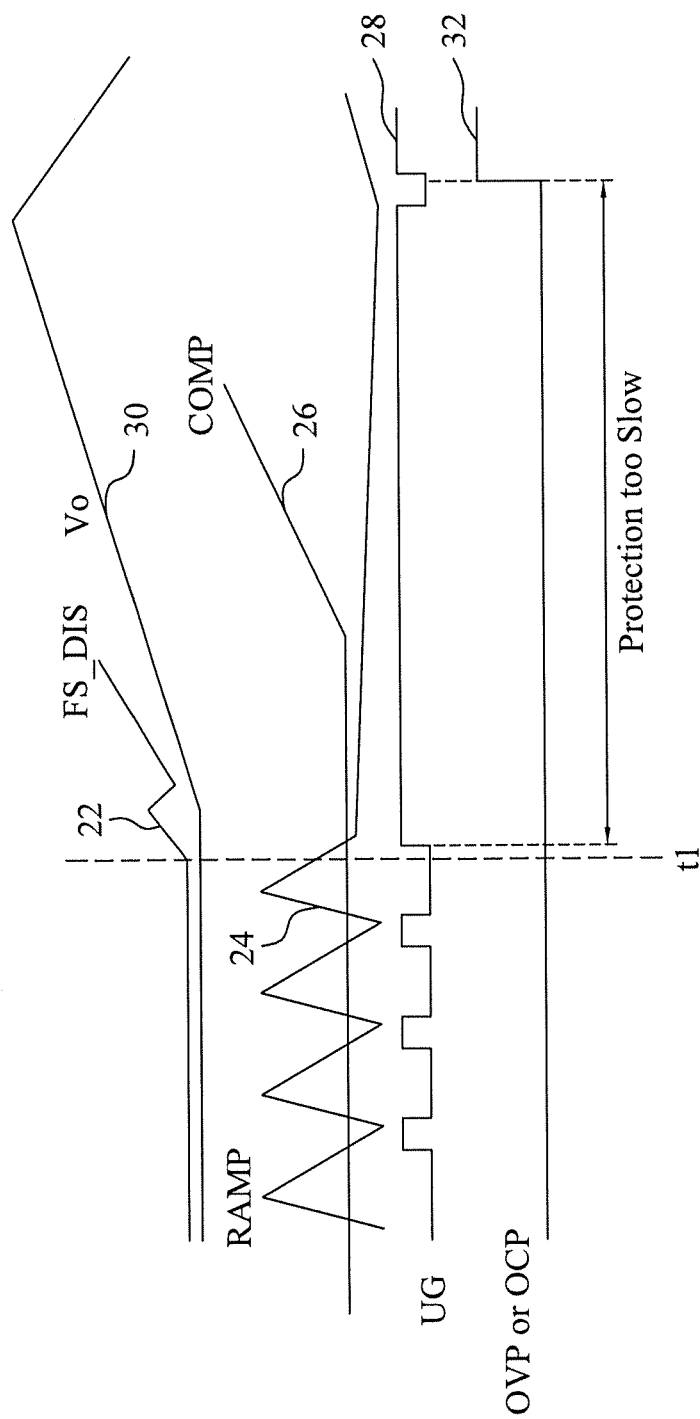
FIG. 2 is a waveform diagram of the power supply shown in FIG. 1.

A parameter setting pin may provide extra functions, for example, in the above mentioned ISL6549 an RT9259, the parameter setting pin may trigger a shutdown signal to turn off the power supply when the voltage of the parameter setting pin is pulled to ground potential. Referring to FIG. 1, a comparator 18 compares the voltage of the pin FS_DIS with a threshold VT which is lower than the reference voltage VREF. When the voltage of the pin FS_DIS decreases to lower than the threshold VT, a shutdown signal SD is triggered to turn off the signal PWM. For realizing this shutdown function, a switch may be connected between the pin FS_DIS and ground and switched by an enable or disable signal. For noise immunity, a delay circuit 20 is added to the output of the comparator 18, so that the delay circuit 20 will not release the shutdown signal SD until the output voltage of the comparator 18 remains high for a preset period. The protection proposed by the present invention may be implemented by using the circuit for such shutdown function.

Figure 3:
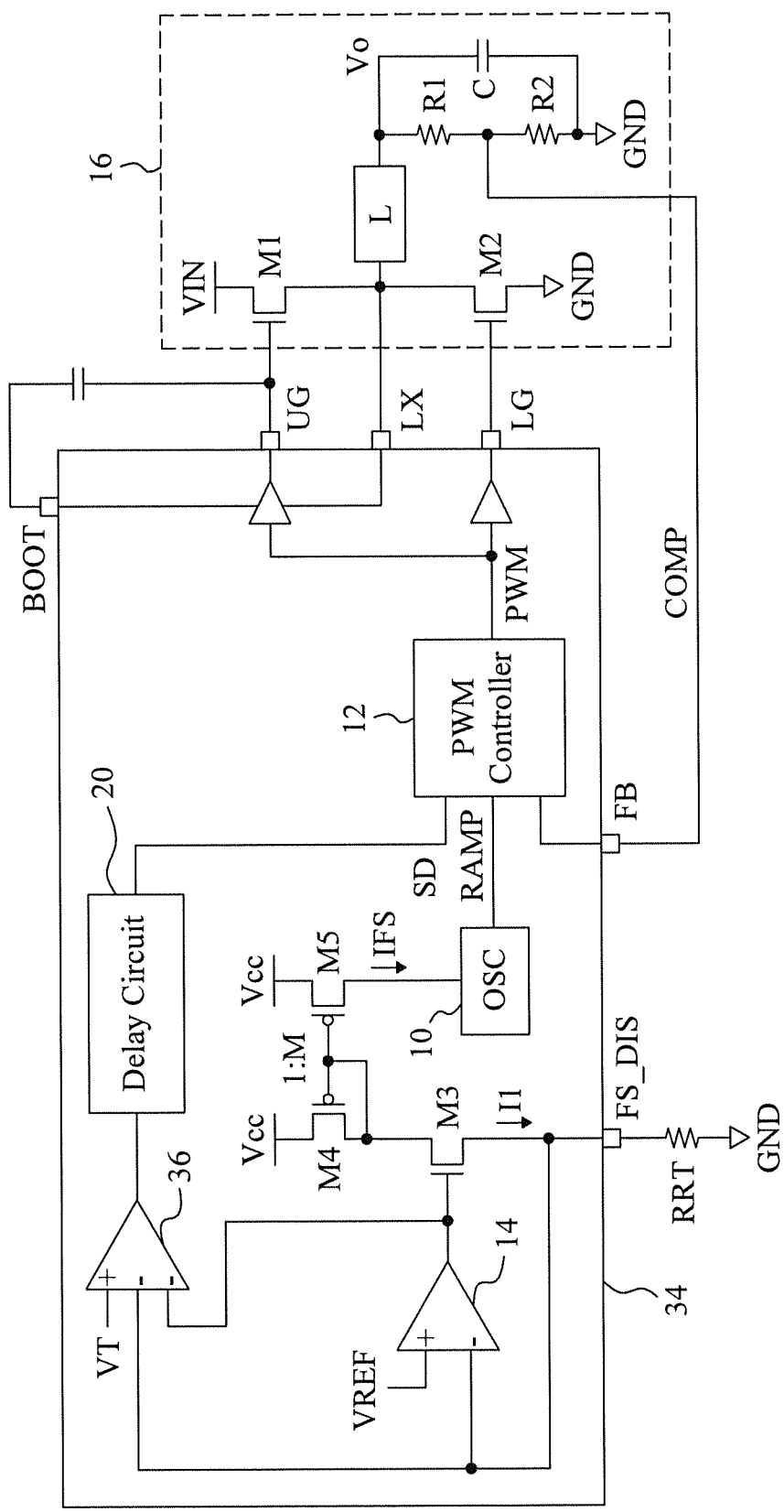
FIG. 3 is a circuit diagram of a first embodiment according to the present invention.

The control IC 34 shown in FIG. 3 is an embodiment designed based on the circuit shown FIG. 1, in which the comparator 18 of FIG. 1 is replaced by a comparator 36 that functions as a circuit for detecting a rapid variation of the internal parameter I1. In this embodiment, since the buffer 14 is realized by an operational amplifier with its output voltage controlling the transistor M3 to provide the current I1, the output voltage of the buffer 14 may be taken as an indication for the rapid variation of the internal parameter I1. The comparator 36 receives not only the voltage of the parameter setting pin FS_DIS and the threshold VT, but also the output voltage of the buffer 14. When the pin FS_DIS is shorted to another pin or a hand, the current I1 will instantly decrease, so the output voltage of the buffer 14 descends rapidly. If the variation of the current I1 exceeds a preset value, the comparator 36 will trigger the shutdown signal SD to turn off the signal PWM, so as to avoid abnormal operation of the power supply. The delay circuit 20 similarly serves to prevent the signal PWM from being turned off due to noise interference.

Figure 4:
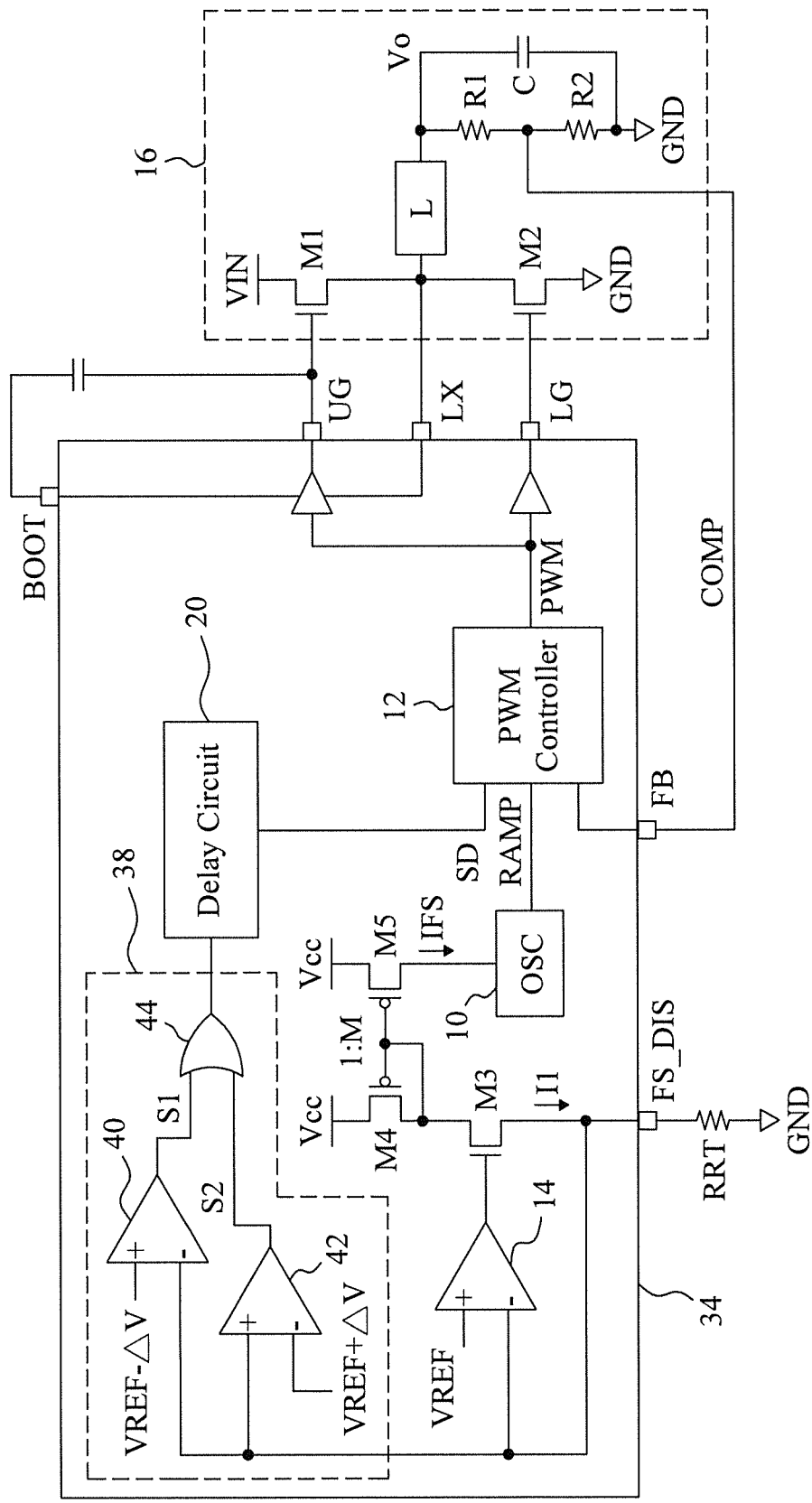
FIG. 4 is a circuit diagram of a second embodiment according to the present invention.

From the teaching of the embodiment shown in FIG. 3, those skilled in the art would appreciate that the comparator 36 for detecting the rapid variation of the internal parameter I1 may be replaced by alternative circuits. For example, in the embodiment shown in FIG. 4, a detection circuit 38 includes a comparator 40 to compare the voltage of the pin FS_DIS with a threshold VREF−$\Delta$V to trigger a comparison signal S1 when the former decreases to lower than the latter, a comparator 42 to compare the voltage of the pin FS_DIS with another threshold VREF+$\Delta$V to trigger another comparison signal S2 when the former increases to higher than the latter, and an OR gate 44 to trigger the shutdown signal SD in response to the comparison signal S1 or S2. Whenever a rapid variation of the current I1 causes the voltage of the pin FS_DIS to vary and excess $\Delta$V, the detection circuit 38 will trigger the shutdown signal SD.

Figure 5:
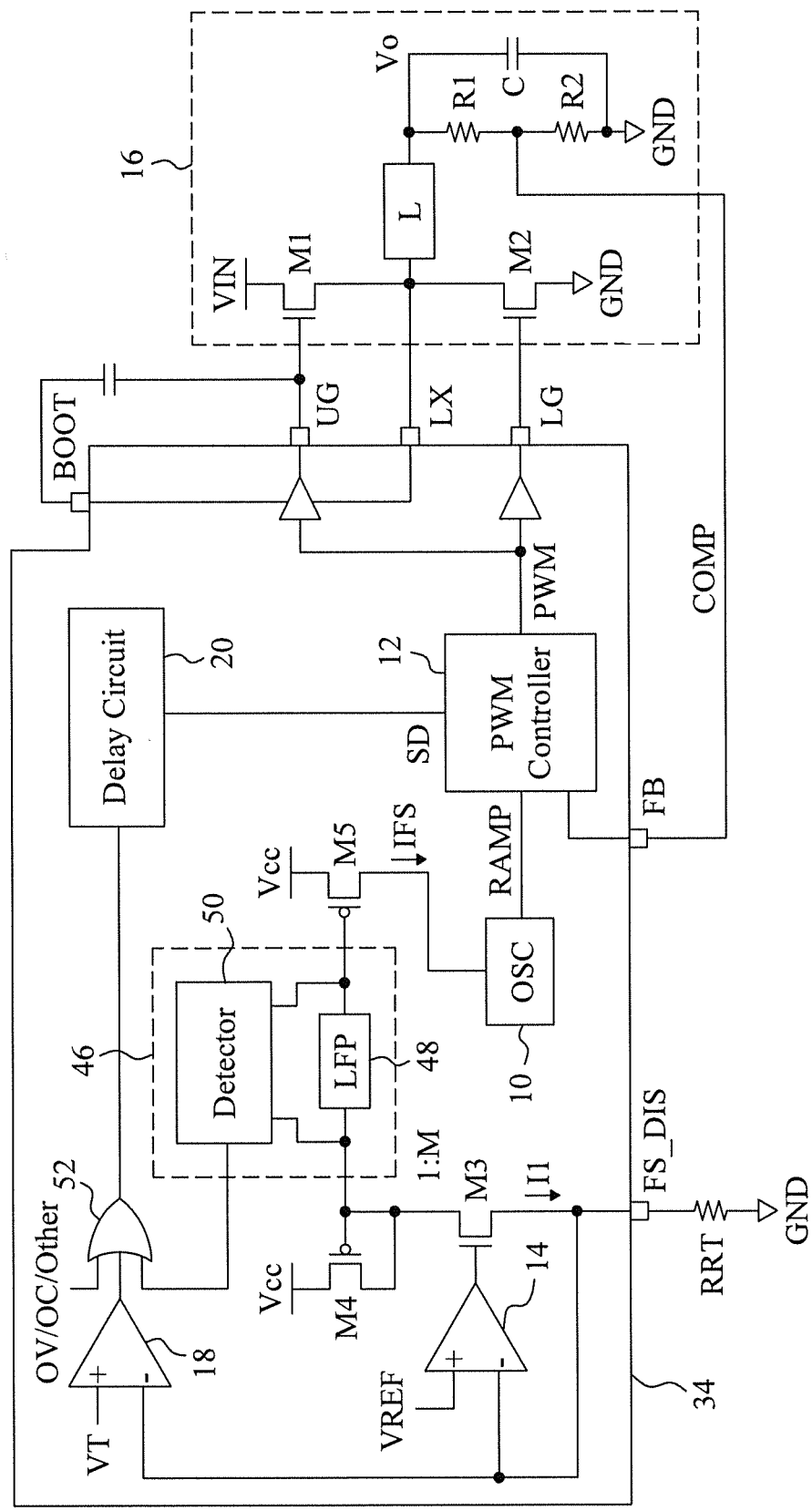
FIG. 5 is a circuit diagram of a third embodiment according to the present invention.

A rapid variation of the current I1 may be alternatively detected from other points in the circuit. For example, in the embodiment shown in FIG. 5, since the current mirror established by the transistors M4 and M5 mirrors the current I1 to generate the current IFS, the detection circuit 46 may detect the rapid variation of the current I1 from the current mirror by having a low pass filter (LPF) 48 connected between the control terminals of the transistors M4 and M5 for slowing down the speed where the variation of the current I1 is reflected to the current IFS, and by having a detector 50 to detect the voltage difference between the control terminals of the transistors M4 and M5. When the pin FS_DIS is not shorted to another pin or a hand, the voltages at the control terminals of the transistors M4 and M5 are equal to each other. When the pin FS_DIS is shorted to another pin or a hand, the variation of the current I1 instantly varies the voltage at the control terminal of the transistor M4. However, in virtue of the LPF 48, the voltage at the control terminal of the transistor M5 does not vary immediately. When detecting that the voltage difference between the control terminals of the transistors M4 and M5 exceeds a preset value, the detector 50 will trigger the shutdown signal SD to turn off the signal PWM, so as to prevent the power supply from abnormal operation. In FIG. 5, an OR gate 52 is used to integrate all shutdown signals, including ones triggered by over voltage protection, over current protection and/or other protection functions in addition to the shutdown signal triggered by the comparator 18 in response to the disable signal and the shutdown signal triggered by the detection circuit 46 in response to the rapid variation of the internal parameter I1.

Figure 6:
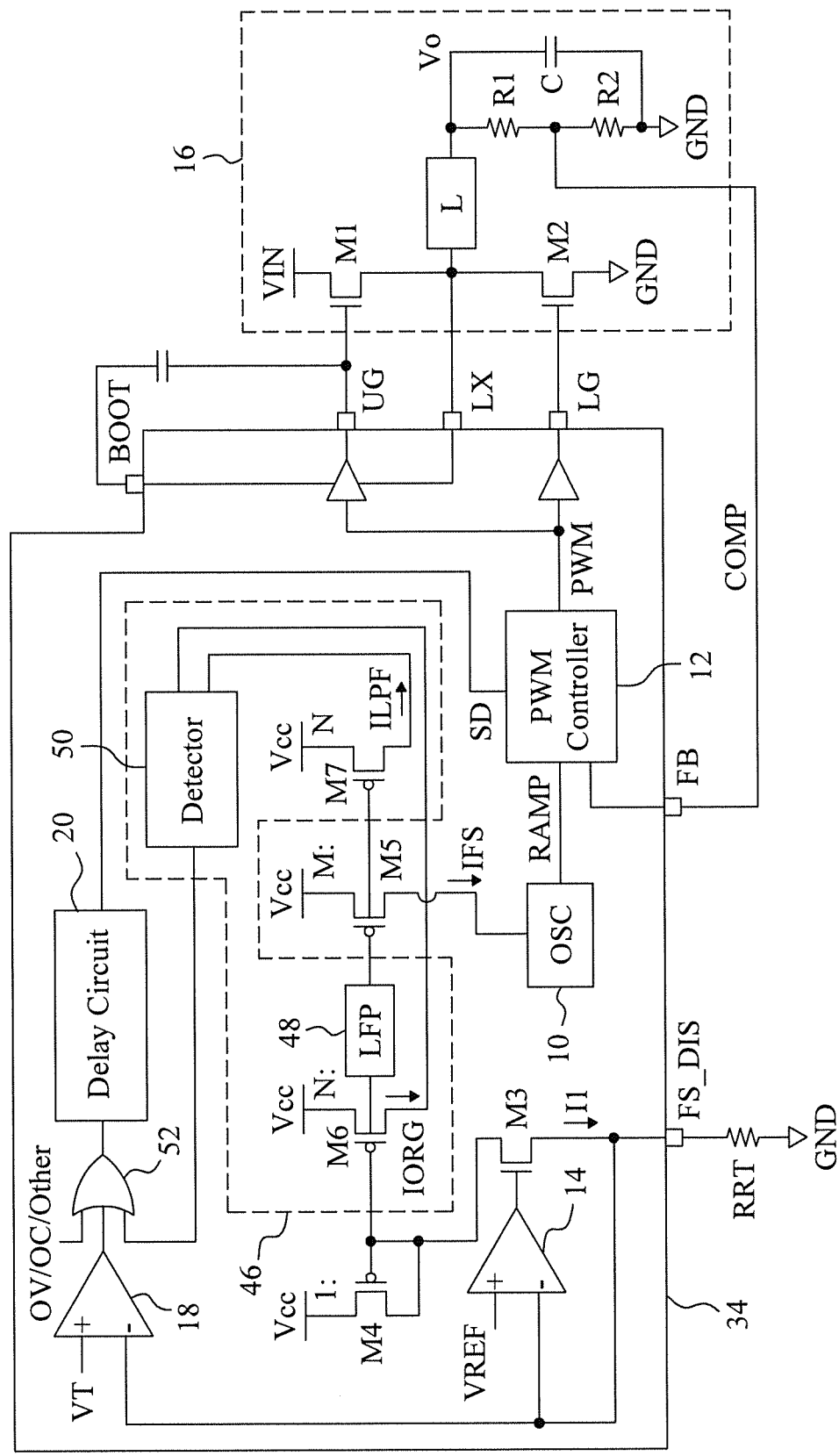
FIG. 6 is a circuit diagram of a fourth embodiment according to the present invention.

From the teaching of the embodiment shown in FIG. 5, those skilled in the art would appreciate that the detection circuit 46 may be replaced by alternative circuits. For example, in the embodiment shown in FIG. 6, the LPF 48 has its input and output connected to transistors M6 and M7, respectively. The transistors M4, M6, M5 and M7 have a size ratio of 1:N:M:N. The transistor M6 mirrors the current I1 to generate a first current IORG, the transistor M7 mirrors the current IFS to generate a second current ILPF, and a detector 50 detects the difference between the currents IORG and ILPF. When the pin FS_DIS is shorted to another pin or a hand, the variation of the current I1 instantly varies the first current IORG. However, in virtue of the LPF 48, the current ILPF does not vary immediately. When the difference between the currents IORG and ILPF exceeds a preset value, the detector 50 will trigger the shutdown signal SD to turn off the signal PWM, so as to prevent the power supply from abnormal operating.

While the foregoing embodiments all integrate the protection function proposed by the present invention with the existing shutdown circuits, those skilled in the art would appreciate that the disclosed protection function may be realized as by independent circuit.

Figure 7:
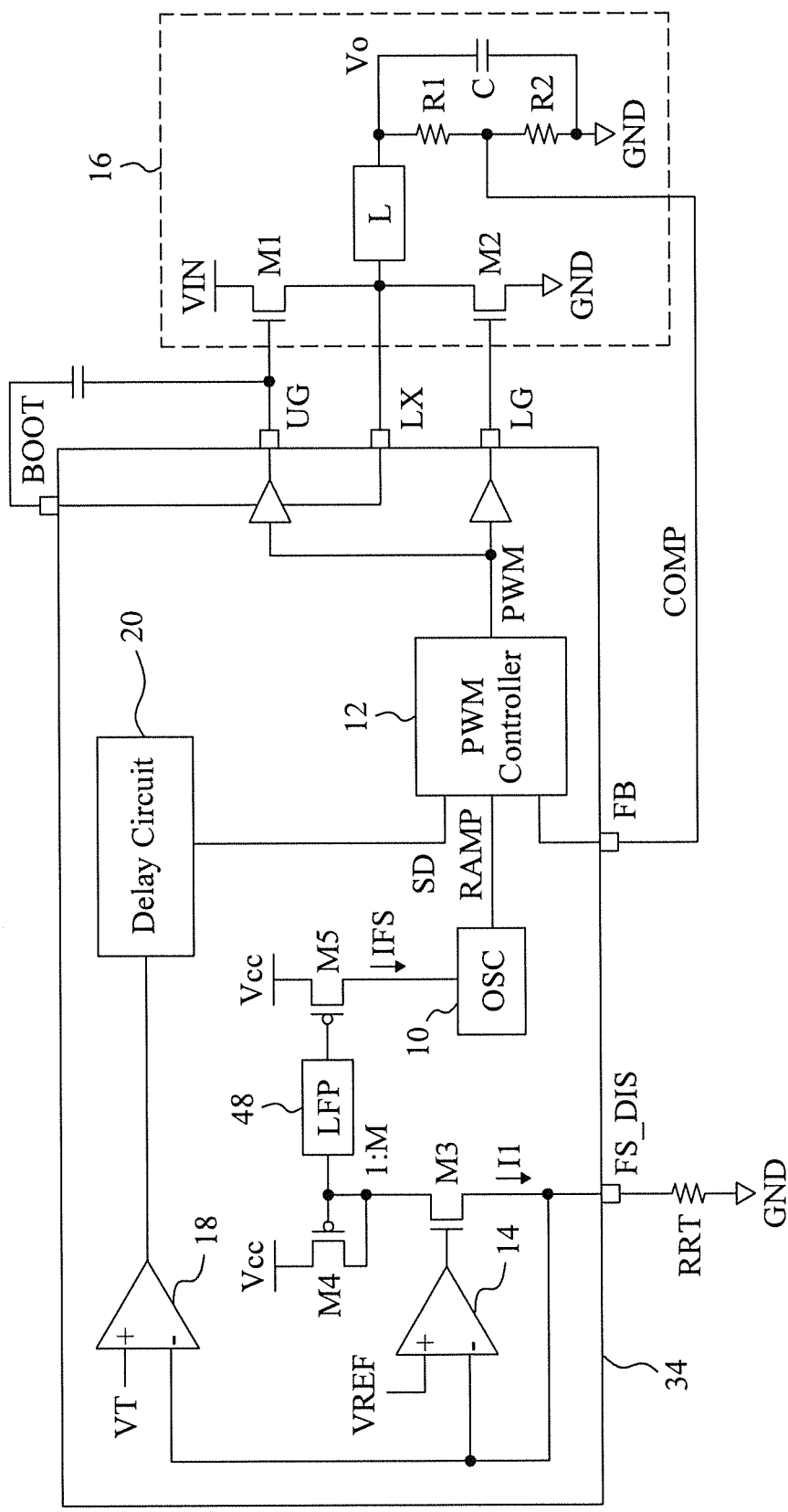
FIG. 7 is a circuit diagram of a fifth embodiment according to the present invention.

In other embodiments, the protection function proposed by the present invention may be implemented without the shutdown signal SD. For example, in the embodiment shown in FIG. 7, the LPF 48 connected between the controls terminals of the transistors M4 and M5 has a bandwidth narrower than that of the PWM loop of the power supply. When the pin FS_DIS is shorted to another pin or a hand, the current I1 instantly varies. However, since the LPF 48 slows down the speed where the variation of the current I1 is reflected to the current IFS, the current IFS varies slowly. Since the LPF 48 has a narrower bandwidth than the PWM loop, the PWM system is able to automatically regulate so as to prevent the output voltage Vo from bouncing.

Although the above embodiments illustrate the scope and theory of the present invention by a frequency adjustable oscillator, those skilled in the art with the teaching of these embodiments would be able to apply the present invention to other internal parameters or other ICs without losing its generality. For example, the internal parameter may be in the form a current or a voltage; the external parameter setting device may be a resistor or any other applicable device; and each of the signals for circuit operation may be in the form of a current or a voltage, while the circuit may be modified or replaced with other circuits. The present invention is featured in that a buffered reference voltage and an external setting device are combined to define an internal parameter, and the rapid variation of the internal parameter is detected or the speed of reflecting the variation of the internal parameters to another signal is slowed down.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A protection apparatus for a system to avoid abnormal operation caused by a shorted parameter setting pin of an integrated circuit, the parameter setting pin connected to an external device for setting an internal parameter of the integrated circuit, the protection apparatus comprising:
   a buffer operative to buffer a reference voltage to the parameter setting pin, wherein the buffered reference voltage and the external device define the internal parameter; and
   a detection circuit operative to detect a rapid variation of the internal parameter to trigger a shutdown signal.

2. The protection apparatus of claim 1, wherein the buffer comprises an operational amplifier having a first input for receiving the reference voltage, a second input connected to the parameter setting pin, and an output for providing a voltage related to the internal parameter.

3. The protection apparatus of claim 2, wherein the detection circuit comprises a comparator having a first input for receiving a threshold, a second input connected to the parameter setting pin, a third input connected to the output of the operational amplifier, and an output for triggering the shutdown signal.

4. The protection apparatus of claim 2, wherein the detection circuit comprises:
   two comparators connected to the parameter setting pin, for comparing the voltage of the parameter setting pin with two thresholds, respectively; and
   an OR gate connected to the two comparators, for triggering the shutdown signal according to outputs of the two comparators.

5. A protection apparatus for a system to avoid abnormal operation caused by a shorted parameter setting pin of an integrated circuit, the parameter setting pin connected to an external device for setting an internal parameter of the integrated circuit, the integrated circuit having a first transistor and a second transistor establishing a current mirror to mirror the internal parameter to generate an adjustable signal, the protection apparatus comprising:
   a buffer operative to buffer a reference voltage to the parameter setting pin, wherein the buffered reference voltage and the external device define the internal parameter; and
   a low pass filter connected between control terminals of the first and second transistors, for slowing down a speed of the variation of the internal parameter reflected to the adjustable signal.

6. The protection apparatus of claim 5, further comprising a detector connected to the control terminals of the first and second transistors, for detecting a voltage difference between the control terminals of the first and second transistors to trigger a shutdown signal.

7. The protection apparatus of claim 5, further comprising:
   a third transistor connected between the first transistor and the low pass filter, for mirroring the internal parameter to generate a first current;
   a fourth transistor connected between the second transistor and the low pass filter, for mirroring the adjustable signal to generate a second current; and
   a detector connected to the third and fourth transistors, for detecting a difference between the first and second currents to trigger a shutdown signal.

8. A protection method for a system to avoid abnormal operation caused by a shorted parameter setting pin of an integrated circuit, the parameter setting pin connected to an external device for setting an internal parameter of the integrated circuit, the protection method comprising the steps of:
   (A) applying a buffered reference voltage to the parameter setting pin to define the internal parameter by the buffered reference voltage and the external device; and
   (B) detecting a rapid variation of the internal parameter to trigger a shutdown signal.

9. The protection method of claim 8, wherein the step B comprises the step of detecting a signal related to the internal parameter.

10. The protection method of claim 8, wherein the step B comprises the step of comparing a voltage of the parameter setting pin with two thresholds, respectively.

11. A protection method for a system to avoid abnormal operation caused by a shorted parameter setting pin of an integrated circuit, the parameter setting pin connected to an external device for setting an internal parameter of the integrated circuit, the integrated circuit having a first transistor and a second transistor establishing a current mirror to mirror the internal parameter to generate an adjustable signal, the protection method comprising the steps of:
   (A) applying a buffered reference voltage to the parameter setting pin to define the internal parameter by the buffered reference voltage and the external device; and
   (B) slowing down a speed of a variation of the internal parameter reflected to the adjustable signal.

12. The protection method of claim 11, further comprising the step of detecting a voltage difference between control terminals of the first and second transistors voltage to trigger a shutdown signal.

13. The protection method of claim 11, further comprising the steps of:
   mirroring the internal parameter to generate a first current;
   mirroring the adjustable signal to generate a second current; and
   detecting a difference between the first and second currents to trigger a shutdown signal.

* * * * *